US012810447B2

(12) United States Patent
Wang et al.

(10) Patent No.: US 12,810,447 B2
(45) Date of Patent: Nov. 24, 2026

(54) MULTI-VIEW FUSION HUMAN MOTION ESTIMATION METHOD BASED ON DISTRIBUTED PROGRESSIVE GAUSSIAN FILTERING

(71) Applicant: Wenzhou University, Zhejiang (CN)

(72) Inventors: Pengjun Wang, Zhejiang (CN); Jiangyu Wu, Zhejiang (CN); Xusheng Yang, Zhejiang (CN); Wenan Zhang, Zhejiang (CN); Han Li, Zhejiang (CN); Xiaochun Guan, Zhejiang (CN)

(73) Assignee: Wenzhou University, Zhejiang (CN)

( * ) Notice: Subject to any disclaimer, the term of this patent is extended or adjusted under 35 U.S.C. 154(b) by 0 days.

(21) Appl. No.: 19/356,185

(22) Filed: Oct. 12, 2025

(65) Prior Publication Data

US 2026/0038131 A1 Feb. 5, 2026

Related U.S. Application Data

(63) Continuation of application No. PCT/CN2023/137802, filed on Dec. 11, 2023.

(30) Foreign Application Priority Data

Nov. 23, 2023 (CN) ........................ 202311572460.7

(51) Int. Cl.
*G06T 7/292* (2017.01)
*G06T 7/80* (2017.01)
(Continued)

(52) U.S. Cl.
CPC ................ *G06T 7/292* (2017.01); *G06T 7/80* (2017.01); *H04N 17/002* (2013.01);
(Continued)

(58) Field of Classification Search
None
See application file for complete search history.

(56) References Cited

U.S. PATENT DOCUMENTS 11,989,977 B2 * 5/2024 Ramani .................. G06F 3/011
2021/0019507 A1 * 1/2021 Brookshire ............ G06V 10/82
(Continued)

FOREIGN PATENT DOCUMENTS

CN 110458944 11/2019
CN 110530365 12/2019
(Continued)

OTHER PUBLICATIONS

Xusheng Yang et al., "Estimation of Human Limb Motion Based on Progressive Unscented Kalman Filter Network", Acta Automatica Sinica, vol. 49, No. 8, Aug. 31, 2023, with English abstract thereof, pp. 1723-1731.
(Continued)

*Primary Examiner* — Daniel T Tekle
(74) *Attorney, Agent, or Firm* — JCIPRNET

(57) ABSTRACT

Disclosed is a multi-view fusion human motion estimation method based on distributed progressive Gaussian filtering. Firstly, data acquisition is performed by means of two Azure Kinect DK cameras and initial data is determined; then, data filtering and fusion processing is performed, the initial data of the two Azure Kinect DK cameras is classified and processed by using Mahalanobis distance, the measurement information of the Azure Kinect DK cameras that are greatly affected by visual occlusion is filtered out and discarded, and the measurement information of one Azure Kinect DK camera that is determined to be less affected by visual occlusion is guided by the measurement information of the other Azure Kinect DK camera to undergo progressive filtering fusion, thereby achieving the effect of implicit
(Continued)

compensation; finally, global fusion is performed, thereby improving the accuracy of human pose estimation.

3 Claims, 2 Drawing Sheets

(51) Int. Cl.
*H04N 17/00* (2006.01)
*H04N 23/661* (2023.01)

(52) U.S. Cl.
CPC . *H04N 23/662* (2023.01); *G06T 2207/10024* (2013.01); *G06T 2207/30196* (2013.01)

(56) References Cited

U.S. PATENT DOCUMENTS

| | | | | |
|---|---|---|---|---|
| 2021/0056297 | A1* | 2/2021 | Shimshoni | G06V 40/103 |
| 2022/0032454 | A1* | 2/2022 | Yang | B25J 9/1612 |
| 2023/0269377 | A1* | 8/2023 | Kodukula | H04N 19/33 375/240.26 |
| 2024/0127479 | A1* | 4/2024 | Shimizu | G01B 11/245 |
| 2024/0177434 | A1* | 5/2024 | Ullal | G02B 27/0172 |
| 2026/0038131 | A1* | 2/2026 | Wang | G06T 7/292 |

FOREIGN PATENT DOCUMENTS

| | | |
|---|---|---|
| CN | 112131928 | 12/2020 |
| CN | 116667815 | 8/2023 |
| WO | 2012046913 | 4/2012 |

OTHER PUBLICATIONS

"International Search Report (Form PCT/ISA/210) of PCT/CN2023/137802", mailed on Jul. 23, 2024, with English translation thereof, pp. 1-5.

* cited by examiner

MULTI-VIEW FUSION HUMAN MOTION ESTIMATION METHOD BASED ON DISTRIBUTED PROGRESSIVE GAUSSIAN FILTERING

CROSS-REFERENCE TO RELATED APPLICATION

This application is a continuation of international application of PCT application serial no. PCT/CN2023/137802, filed on Dec. 11, 2023, which claims the priority benefit of China application no. 202311572460.7, filed on Nov. 23, 2023. The entirety of each of the above mentioned patent applications is hereby incorporated by reference herein and made a part of this specification.

TECHNICAL FIELD

The present invention relates to a human motion estimation method, and more particular to a multi-view fusion human motion estimation method based on distributed progressive Gaussian filtering.

BACKGROUND

With the development of machine learning and computer vision, AI fitness coaches are increasingly widely used in the field of fitness. In the development and use of AI fitness coaches, human motion (i.e., pose) estimation is required to detect the fitness pose data of testers. In conventional human motion estimation methods, human pose data is acquired by means of a human pose capture system. Although the human pose capture system can obtain high-accuracy human pose data, there are some challenges of expensive hardware and high cost due to use of more than a dozen professional cameras. In addition, testers experience inconvenient because they need to wear many joint point markers.

In order to solve the problem of conventional human motion estimation methods, there is currently a human motion estimation method, in which a low-cost RGB-D camera is used to capture a single image of a tester, and then the current three-dimensional (3D) pose of the tester is estimated based on the single image and the corresponding 3D joint point position data (i.e., human pose data) is detected. The human motion estimation method is low in cost and will not cause inconvenience to testers. However, in the human motion estimation method, when the tester crosses his arms or turns sideways, some joint points of the human body in the images captured by the RGB-D camera will be occluded, and the accuracy of the position data of the occluded joint points estimated based on these images is not high, resulting in a reduction in the overall accuracy of the human pose data.

SUMMARY OF THE INVENTION

The technical problem to be solved by the present invention is to provide a multi-view fusion human motion estimation method based on distributed progressive Gaussian filtering that has low cost and high accuracy, does not require testers to wear joint point markers, and does not cause inconvenience to testers.

The technical solutions adopted by the present invention to solve the above technical problems are as follows: A multi-view fusion human motion estimation method based on distributed progressive Gaussian filtering is provided. The method runs in a system architecture including a multi-vision data acquisition module, a data synchronization and preprocessing module, and a core computing and fusion module, and includes the following steps.

Step 1. initial data is acquired by using a multi-vision data acquisition module, where the multi-vision data acquisition module includes a test bench, two Azure Kinect DK cameras, and a checkerboard calibration board with a square length of 10 mm and a 8*6 pattern array; wherein the step 1 comprises:

S1.1. placing the two Azure Kinect DK cameras on the test bench, wherein the two Azure Kinect DK cameras are positioned on the same horizontal plane, with a field of view overlap rate reaching 80% or above, and the fields of view of both the two Azure Kinect DK cameras completely cover a tester in the center of the test bench; and S1.2. letting the tester stand upright in the center of the test bench with two hands holding a checkerboard calibration plate with a square length of 10 mm and a 8*6 pattern array, so that a checkerboard pattern on the front of the 8*6 checkerboard calibration plate is clearly seen by the two Azure Kinect DK cameras.

Step 2. data synchronize and preprocessing is performed by using the data synchronization and preprocessing module, wherein the step 2 comprises:

S2.1. firstly, turning on the two Azure Kinect DK cameras at the same time to take one frame of color image data, and then turning off the two Azure Kinect DK cameras; then, the data synchronization and preprocessing module acquiring the one frame of color image data captured by each of the two Azure Kinect DK cameras, thus obtaining two frames of color image data currently, where nanosecond clock synchronization is realized by an IEEE 1588v2 (PTP) protocol or a dedicated synchronization chip, thereby achieving spatio-temporal alignment of the data of the two Azure Kinect DK cameras;

S2.2. processing the two frames of color image data by using an OpenCV software toolkit pre-stored in the data synchronization and preprocessing module to obtain a coordinate system transformation matrix between the two Azure Kinect DK cameras, denoted as W;

S2.3. removing the checkerboard calibration board from the tester, and then letting the tester enter a ready state;

S2.4. letting the tester to do test actions and at the same time turning on the two Azure Kinect DK cameras simultaneously to film videos until the tester completes all the test actions, and after the two Azure Kinect DK cameras completes the video filming and output the videos to the data synchronization and preprocessing module, turning off the two Azure Kinect DK cameras, where each frame of data in the video filmed by each Azure Kinect DK camera includes image data and human skeleton data corresponding to the image data, the human skeleton data includes three-dimensional position vectors of 32 human skeleton joint points in a coordinate system of the Azure Kinect DK camera, the 32 human skeleton joint points are pelvis, spine, thoracic spine, neck, left clavicle, left shoulder, left elbow, left wrist, left hand, left hand tip, left thumb, right clavicle, right shoulder, right elbow, right wrist, right hand tip, right thumb, left hip, left knee, left ankle, left foot, right hip, right knee, right ankle, right foot, head, nose, left eye, left ear, right eye and right ear; numbering the pelvis, spine, thoracic spine, neck, left clavicle, left shoulder, left elbow, left wrist, left hand, left hand tip, left thumb, right clavicle, right shoulder, right elbow, right wrist, right hand, right hand tip, right thumb, left hip, left knee, left ankle, left foot, right hip, right knee, right ankle, right foot, head, nose, left eye, left ear, right eye and right ear in order from 1 to 32, respectively, where a human skeleton joint point numbered/is called joint point l, l=1, 2, . . . , 32, and the total number of frames of data in the video filmed by each of the two Azure Kinect DK cameras is denoted as Y (that is, each Azure Kinect DK camera obtains Y frames of data); and S2.5. at the data synchronization and preprocessing module, setting any one of the two Azure Kinect DK cameras as a master camera and the other as a slave camera; multiplying the three-dimensional position vector of joint point l in a a-th frame of data obtained by the slave camera by the coordinate system transformation matrix W to obtain a mapping vector of the joint point l in the coordinate system of the master camera, which is called the mapping vector of the joint point l and is denoted as $$z_{l,a}^{s},$$

where the three-dimensional position vector of joint point l in a a-th frame of data obtained by the master camera is denoted as $$z_{l,a}^{m},$$

a=1, 2, . . . , Y; realizing spatio-temporal synchronization of data from the two Azure Kinect DK cameras by the coordinate system transformation matrix W, IEEE 1588v2 (PTP) protocol or a dedicated synchronization chip; the data synchronization and preprocessing module outputting the obtained data to the core computing and fusion module.

Step 3. in the core computing and fusion module, firstly, setting a global three-dimensional position vector estimate of the joint point l of the a-th frame data as $$\hat{x}_{l,a|a}^{f},$$

and setting the uncertainty value of $$\hat{x}_{l,a|a}^{f}$$

as a covariance matrix $$P_{l,a|a}^{f};$$

initializing the global three-dimensional position vector estimate $$\hat{x}_{l,1|1}^{f}$$

of the joint point l of the first frame of data, letting $$\hat{x}_{l,1|1}^{f} = (z_{l,1}^{m} + z_{l,1}^{s})/2,$$

initializing the covariance matrix $$P_{l,1|1}^{f}$$

of $$\hat{x}_{l,1|1}^{f},$$

letting $$P_{l,1|1}^{f} = 3*3$$

unit matrix which is denoted as I; setting a measurement noise covariance of $$z_{l,a}^{m}$$

as $$R_{a}^{m}$$

and letting $$R_{a}^{m} = 3*I;$$

setting a measurement noise covariance of $$z_{l,a}^{s}$$

as $$R_{a}^{s}$$

and letting $$R_{a}^{s} = 3*I;$$

setting a measurement matrix of any human skeleton joint point in the a-th frame of data as $H_a$, and letting $H_a$=I, where * is the symbol of multiplication; and then, performing data filtering and fusion processing operations, specific processes are as follows:

S3.1. setting a frame number variable as k, and initializing k and letting k=2;

S3.2. processing the three-dimensional position vector $$z_{l,k}^{m}$$

of the joint point l in the k-th data obtained by the master camera and the mapping vector $$z_{l,k}^{s}$$

of the joint point l to obtain the global three-dimensional position vector estimate $$\hat{x}_{l,k|k}^{f}$$

of the joint point l in the k-th frame of data; specifically,

S3.2.1. setting a state transition matrix of the k-th frame of data as $F_k$, and letting $F_k$=I; setting a process noise covariance matrix of the k-th frame of data as $Q_k$, and letting $Q_k$=0.2*I; setting a predicated global three-dimensional position vector of the joint point l in the k-th frame of data as $$\hat{x}_{l,k|k-1}^{f};$$

setting the covariance matrix of $$\hat{x}_{l,k|k-1}^{f}$$

as $$P_{l,k|k-1}^{f};$$

S3.2.2. based on previous human motion estimates $$\hat{x}_{l,k-1|k-1}^{f} \text{ and } P_{l,k-1|k-1}^{f},$$

calculating the predicted values $$\hat{x}_{l,k|k-1}^{f} \text{ and } P_{l,k|k-1}^{f}$$

for current human motion estimates using Equations (1) and (2) respectively:

$$\hat{x}_{l,k|k-1}^{f} = F_k * \hat{x}_{l,k-1|k-1}^{f} \quad (1)$$

$$P_{l,k|k-1}^{f} = F_k * P_{l,k-1|k-1}^{f} * F_k^T + Q_k \quad (2)$$

in Equation (2), corner mark T represents the transpose symbol of the matrix;

S3.2.3. setting the square of Mahalanobis distance between $$z_{l,k}^{s} \text{ and } z_{l,k}^{m}$$

as $$\gamma(z_{l,k}^{s}, z_{l,k}^{m}),$$

and calculating $$\gamma(z_{l,k}^{s}, z_{l,k}^{m})$$

using Equation (3), $$\gamma(z_{l,k}^{s}, z_{l,k}^{m}) = (z_{l,k}^{s} - z_{l,k}^{m})^T * \sum\nolimits_{zz}^{-1} * (z_{l,k}^{s} - z_{l,k}^{m}) \quad (3)$$

in equation (3), $$\sum\nolimits_{zz}^{-1} = (R_k^s + R_k^m)^{-1};$$

S3.2.4. setting the square of Mahalanobis distance between $$z_{l,k}^{s} \text{ and } H_k * \hat{x}_{l,k|k-1}^{f}$$

as $$\gamma(z_{l,k}^{s}, H_k * \hat{x}_{l,k|k-1}^{f}),$$

setting the square of Mahalanobis distance between $$z_{l,k}^{m} \text{ and } H_k * \hat{x}_{l,k|k-1}^{f}$$

as $$\gamma(z_{l,k}^{m}, H_k * \hat{x}_{l,k|k-1}^{f}),$$

and calculating $$\gamma(z_{l,k}^{s}, H_k * \hat{x}_{l,k|k-1}^{f}) \text{ and } \gamma(z_{l,k}^{m}, H_k * \hat{x}_{l,k|k-1}^{f})$$

respectively using Equations (4) and (5):

$$\gamma(z^s_{l,k}, H_k * \hat{x}^f_{l,k|k-1}) = (z^s_{l,k} - H_k * \hat{x}^f_{l,k|k-1})^T * \sum\nolimits_{sz}^{-1} * (z^s_{l,k} - H_k * \hat{x}^f_{l,k|k-1}) \quad (4)$$

$$\gamma(z^m_{l,k}, H_k * \hat{x}^f_{l,k|k-1}) = (z^m_{l,k} - H_k * \hat{x}^f_{l,k|k-1})^T * \sum\nolimits_{mz}^{-1} * (z^m_{l,k} - H_k * \hat{x}^f_{l,k|k-1}) \quad (5)$$

in equation (4), $$\sum\nolimits_{sz}^{-1} = (R^s_k + H_k * P^{f*}_{l,k|k-1} * H^T_k)^{-1},$$

and in equation (5)

$$\sum\nolimits_{mz}^{-1} = (R^m_k + H_k * P^f_{l,k|k-1} * H^T_k)^{-1};$$

S3.2.5. setting a confidence threshold of joint point l as $\chi_1$, where the value of $\chi_1$ is not less than 10 but not greater than 20;

S3.2.6. comparing $$\gamma(z^s_{l,k}, z^m_{l,k}),\ \gamma(z^s_{l,k}, H_k * \hat{x}^f_{l,k|k-1}) \text{ and } \gamma(z^m_{l,k}, H_k * \hat{x}^f_{l,k|k-1})$$

with $\chi_1$ respectively and then performing data processing based on the comparison results respectively; specifically, when the comparison results satisfy $$\gamma(z^s_{l,k}, z^m_{l,k}) < \chi_l, \text{ or } \gamma(z^s_{l,k}, H_k * \hat{x}^f_{k|k-1}) < \chi_l \text{ and } \gamma(z^m_{l,k}, H_k * \hat{x}^f_{k|k-1}) < \chi_l,$$

the processing process including:

A1. calculating a local three-dimensional position vector estimate $$\hat{x}^s_{l,k|k}$$

of joint point l in the k-th frame of data obtained by the slave camera and the covariance matrix $$P^s_{l,k|k}$$

of $$\hat{x}^s_{l,k|k}$$

respectively using Equations (6), (7) and (8):

$$\hat{x}^s_{l,k|k} = \hat{x}^f_{l,k|k-1} + K^s_k * (z^s_{l,k} - H_k * \hat{x}^f_{l,k|k-1}) \quad (6)$$

$$K^s_k = P^f_{l,k|k-1} * H^T_k * (H_k * P^f_{l,k|k-1} * H^T_k + R^s_k)^{-1} \quad (7)$$

$$P^s_{l,k|k} = (I - K^s_k * H_k) * P^f_{l,k|k-1} \quad (8)$$

A2. calculating a local three-dimensional position vector estimate $$\hat{x}^m_{l,k|k}$$

of joint point l in the k-th frame of data obtained by the master camera and the covariance matrix $$P^m_{l,k|k}$$

of $$\hat{x}^m_{l,k|k}$$

respectively using Equations (9), (10) and (11):

$$\hat{x}^m_{l,k|k} = \hat{x}^f_{l,k|k-1} + K^m_k * (z^m_{l,k} - H_k * \hat{x}^f_{l,k|k-1}) \quad (9)$$

$$K^m_k = P^f_{l,k|k-1} * H^T_k * (H_k * P^f_{l,k|k-1} * H^T_k + R^m_k)^{-1} \quad (10)$$

$$P^m_{l,k|k} = (I - K^m_k * H_k) * P^f_{l,k|k-1} \quad (11)$$

A3. entering step S3.2.7; when the comparison results satisfy $$\gamma(z^s_{l,k}, z^m_{l,k}) \ge \chi_l \text{ and } \gamma(z^s_{l,k}, H_k * \hat{x}^f_{k|k-1}) < \chi_l \text{ and } \chi_l \le \gamma(z^m_{l,k}, H_k * \hat{x}^f_{k|k-1}),$$

the processing process specifically including:

B1. calculating the local three-dimensional position vector estimate $$\hat{x}^s_{l,k|k}$$

of joint point l in the k-th frame of data obtained by the slave camera and the covariance matrix $$P^s_{l,k|k}$$

of $$\hat{x}^s_{l,k|k}$$

respectively using Equations (6), (7), and (8):

B2. determining whether $$\gamma(z^m_{l,k}, H_k * \hat{x}^f_{k|k-1}) \ge 2 * \chi_l$$

is established; if so, letting $$\hat{x}^{m}_{l,k|k} = \hat{x}^{f}_{l,k|k-1} \text{ and } P^{m}_{l,k|k} = P^{f}_{l,k|k-1};$$

then, entering step S3.2.7; if not, continuing to perform progressive filtering on the three-dimensional position vector $$z^{m}_{l,k}$$

of the joint point l in the k-th frame of data acquired by the master camera; specifically, the progressive filtering process including:

$$k\, l\, \hat{x}^{m}_{l,k|k}$$

B2.1. setting the iteration variable of progressive filtering as t, setting the maximum number M of iteration steps as M=10, and setting state variables in the progressive filtering as $$\hat{x}^{m,0}_{l,k|k},\ \hat{P}^{m,0}_{l,k|k};$$

B2.2. initializing t, and letting t=1; initializing $$\hat{x}^{m,0}_{l,k|k} \text{ and } \hat{P}^{m,0}_{l,k|k},$$

and letting $$\hat{x}^{m,0}_{l,k|k} = \hat{x}^{f}_{l,k|k-1},\ \hat{P}^{m,0}_{l,k|k} = P^{f}_{l,k|k-1};$$

and

B2.3. performing a t-th iteration of filtering; specifically,

B2.3.1. calculating the intermediate state variable $$\hat{x}^{m,t}_{l,k|k}$$

or the t-th iteration, the intermediate state covariance matrix $$P^{m,t}_{l,k|k}$$

of the t-th iteration, and the intermediate determination variable $$\varphi^{m,t}_{k}$$

or the t-th iteration using Equations (12) to (16):

$$\left(P^{m,t}_{l,k|k}\right)^{-1} * \hat{x}^{m,t}_{l,k|k} = \left(P^{m,t-1}_{l,k|k}\right)^{-1} * \hat{x}^{m,t-1}_{l,k|k} + (H_k)^T * (M * R^m_k)^{-1} * z^m_{l,k} \tag{12}$$

$$\left(P^{m,t}_{l,k|k}\right)^{-1} = \left(P^{m,t-1}_{l,k|k}\right)^{-1} + (H_k)^T * (M * R^m_k)^{-1} * H_k \tag{13}$$

$$\varphi^{m,t}_{k} = \gamma\left(z^s_{l,k}, H_k * \hat{x}^{m,t}_{l,k|k}\right) - \gamma\left(z^s_{l,k}, H_k * \hat{x}^{m,t-1}_{l,k|k}\right) \tag{14}$$

$$\gamma\left(z^s_{l,k}, H_k * \hat{x}^{m,t}_{l,k|k}\right) = \left(z^s_{l,k} - H_k * \hat{x}^{m,t}_{l,k|k}\right)^T * \Sigma^{-1}_{sm,t} * \left(z^s_{l,k} - H_k * \hat{x}^{m,t}_{l,k|k}\right) \tag{15}$$

$$\gamma\left(z^s_{l,k}, H_k * \hat{x}^{m,t-1}_{l,k|k}\right) = \left(z^s_{l,k} - H_k * \hat{x}^{m,t-1}_{l,k|k}\right)^T * \Sigma^{-1}_{sm,t-1} * \left(z^s_{l,k} - H_k * \hat{x}^{m,t-1}_{l,k|k}\right) \tag{16}$$

in the above equations, $$\Sigma^{-1}_{sm,t} = \left(R^s_k + H_k * P^{m,t}_{l,k|k} * H^T_k\right)^{-1},\ \Sigma^{-1}_{sm,t-1} = \left(R^s_k + H_k * P^{m,t-1}_{l,k|k} * H^T_k\right)^{1};$$

and

B2.3.2. determining whether $$\varphi^{m,t}_{k} > 0$$

is established, if so, letting $$\hat{x}^{m}_{l,k|k} = \hat{x}^{m,t}_{l,k|k},\ P^{m}_{l,k|k} = P^{m,t}_{l,k|k},$$

and then, entering step S3.2.7; if not, further determining whether the current value of t is equal to M; if not, updating the value of t with the current value of t plus 1, and then returning to step B2.3 for next iteration; and if so, letting $$\hat{x}^{m}_{l,k|k} = \hat{x}^{m,M}_{l,k|k},\ P^{m}_{l,k|k} = P^{m,M}_{l,k|k},$$

and then entering step S3.2.7; and when the comparison results satisfy $$\gamma\left(z^s_{l,k}, z^m_{l,k}\right) \geq \chi_l \text{ and } \gamma\left(z^m_{l,k}, H_k * \hat{x}^{f}_{k|k-1}\right) < \chi_l \text{ and } \chi_l \leq \gamma\left(z^s_{l,k}, H_k * \hat{x}^{f}_{k|k-1}\right),$$

the processing process specifically including:

C1. calculating the local three-dimensional position vector estimate $$\hat{x}^{m}_{l,k|k}$$

of joint point l in the k-th frame of data acquired by the master camera and the covariance matrix $$P^{m}_{l,k|k}$$

of $$\hat{x}^{m}_{l,k|k}$$

respectively using equations (9), (10) and (11):

C2. determining whether $$\gamma\left(z_{l,k}^{s}, H_k * \hat{x}_{k|k-1}^{f}\right) \geq 2 * \chi_l$$

is established; if so, letting $$\hat{x}_{l,k|k}^{s} = \hat{x}_{l,k|k-1}^{f} \text{ and } P_{l,k|k}^{s} = P_{l,k|k-1}^{f};$$

then, entering step S3.2.7; if not, continuing to perform progressive filtering on the mapping vector $$z_{l,k}^{s}$$

of the joint point l in the k-th frame of data acquired by the slave camera; specifically, the progressive filtering process including:

$$k\, l\, \hat{x}_{l,k|k}^{s}$$

C2.1. setting the iteration variable of progressive filtering as n, setting the maximum number N of iteration steps as N=10, and setting state variables in the progressive filtering as $$\hat{x}_{l,k|k}^{s,0}, \hat{P}_{l,k|k}^{s,0};$$

and

C2.2. initializing n and letting n=1; initializing $$\hat{x}_{l,k|k}^{s,0} \text{ and } \hat{P}_{l,k|k}^{s,0},$$

and letting $$\hat{x}_{l,k|k}^{s,0} = \hat{x}_{l,k|k-1}^{f}, \hat{P}_{l,k|k}^{s,0} = P_{l,k|k-1}^{f};$$

and

C2.3. performing an n-th iteration of filtering; specifically,

C2.3.1. calculating the intermediate state variable $$\hat{x}_{l,k|k}^{s,n},$$

intermediate state covariance matrix $$P_{l,k|k}^{s,n}$$

and intermediate determination variable $$\varphi_k^{s,n}$$

of the n-th iteration of progressive filtering in the slave camera using Equations (17) to (21):

$$\left(P_{l,k|k}^{s,n}\right)^{-1} * \hat{x}_{l,k|k}^{s,n} = \left(P_{l,k|k}^{s,n-1}\right)^{-1} * \hat{x}_{l,k|k}^{s,n-1} + (H_k)^T * (N * R_k^s)^{-1} * z_{l,k}^{s} \tag{17}$$

$$\left(P_{l,k|k}^{s,n}\right)^{-1} = \left(P_{l,k|k}^{s,n-1}\right)^{-1} + (H_k)^T * (N * R_k^s)^{-1} * H_k \tag{18}$$

$$\varphi_k^{s,n} = \gamma\left(z_{l,k}^{m}, H_k * \hat{x}_{l,k|k}^{s,n}\right) - \gamma\left(z_{l,k}^{m}, H_k * \hat{x}_{l,k|k}^{s,n-1}\right) \tag{19}$$

$$\gamma\left(z_{l,k}^{m}, H_k * \hat{x}_{l,k|k}^{s,n}\right) = \left(z_{l,k}^{m} - H_k * \hat{x}_{l,k|k}^{s,n}\right)^T * \sum\nolimits_{ms,n}^{-1} * \left(z_{l,k}^{m} - H_k * \hat{x}_{l,k|k}^{s,n}\right) \tag{20}$$

$$\gamma\left(z_{l,k}^{m}, H_k * \hat{x}_{l,k|k}^{s,n-1}\right) = \left(z_{l,k}^{m} - H_k * \hat{x}_{l,k|k}^{s,n-1}\right)^T * \sum\nolimits_{ms,n-1}^{-1} * \left(z_{l,k}^{m} - H_k * \hat{x}_{l,k|k}^{s,n-1}\right) \tag{21}$$

in the above equations, $$\sum\nolimits_{ms,n}^{-1} = \left(R_k^m + H_k * P_{l,k|k}^{s,n} * H_k^T\right)^1, \sum\nolimits_{ms,n-1}^{-1} = \left(R_k^m + H_k * P_{l,k|k}^{s,n-1} * H_k^T\right)^{-1};$$

and

C2.3.2. determining whether $$\varphi_k^{s,n} > 0$$

is established; if so, letting $$\hat{x}_{l,k|k}^{s} = \hat{x}_{l,k|k}^{s,n}, P_{l,k|k}^{s} = P_{l,k|k}^{s,n},$$

and then, entering step S3.2.7; if not, further determining whether the current value of n is equal to N; if not, updating the value of n with the current value of n plus 1, and then returning to step C2.3 for next iteration of filtering; and if so, letting $$\hat{x}_{l,k|k}^{s} = \hat{x}_{l,k|k}^{s,N}, P_{l,k|k}^{s} = P_{l,k|k}^{s,N},$$

and then entering step S3.2.7;

when comparison results satisfy $$\gamma\left(z_{l,k}^{s}, z_{l,k}^{m}\right) \geq \chi_l \text{ and } \gamma\left(z_{l,k}^{s}, H_k * \hat{x}_{k|k-1}^{f}\right) \geq \chi_l \text{ and } \gamma\left(z_{l,k}^{m}, H_k * \hat{x}_{k|k-1}^{f}\right) \geq \chi_l,$$

directly letting $$\hat{x}_{l,k|k}^{s} = \hat{x}_{l,k|k-1}^{f}, P_{l,k|k}^{s} = P_{l,k|k-1}^{f}, \hat{x}_{l,k|k}^{m} = \hat{x}_{l,k|k-1}^{f}, P_{l,k|k}^{m} = P_{l,k|k-1}^{f}$$

and then entering step S3.2.7;

S3.2.7. calculating the global three-dimensional position vector estimate $$\hat{x}^{f}_{l,k|k}$$

of joint point l in the k-th frame of data obtained and the covariance matrix $$P^{f}_{l,k|k} \text{ of } \hat{x}^{f}_{l,k|k}$$

respectively using Equations (22) and (23); and $$P^{f}_{l,k|k} = \left[\left(P^{s}_{l,k|k}\right)^{-1} + \left(P^{m}_{l,k|k}\right)^{-1} - \left(P^{f}_{l,k|k-1}\right)^{-1}\right]^{-1} \tag{22}$$

$$\hat{x}^{f}_{l,k|k} = P^{f}_{l,k|k} * \left[\left(P^{s}_{l,k|k}\right)^{-1} * \hat{x}^{s}_{l,k|k} + \left(P^{m}_{l,k|k}\right)^{-1} * \hat{x}^{m}_{l,k|k} - \left(P^{f}_{l,k|k-1}\right)^{-1} * \hat{x}^{f}_{l,k|k-1}\right] \tag{23}$$

S3.3. determining whether the current value of k is equal to Y; if not, updating the value of k with the current value of k plus 1, and then returning to step S3.2 for processing a next frame of data; if so, ending the human pose estimation, with $$\hat{x}^{f}_{1,1|1}, \cdots, \hat{x}^{f}_{32,1|1}, \hat{x}^{f}_{1,2|2}, \cdots, \hat{x}^{f}_{32,2|2}, \cdots, \hat{x}^{f}_{1,Y|Y} \cdots, \hat{x}^{f}_{32,Y|Y}$$

being regarded as the obtained human pose data.

Further, the data synchronization and preprocessing module is implemented by using a QX550 network card in combination with a PSB (Platform Sync Board) module.

Further, the core computing and fusion module is implemented using embedded AI computers (NVIDIA Jetson AGX Orin and Xilinx FPGA) and field programmable gate array products (Xilinx FPGA).

Compared with the prior art, the invention has the following advantages: Data acquisition is performed by means of two Azure Kinect DK cameras to obtain the three-dimensional position vectors of 32 human skeleton joint points in the coordinate system of each Azure Kinect DK camera, which is the measurement information of each Azure Kinect DK camera, Then, the initial data of each joint point obtained by each camera is determined based on the measurement information of each Azure Kinect DK camera (the initial data of each joint point obtained by the slave camera is expressed as the mapping vector of each joint point in the main camera coordinate system obtained by the slave camera; the initial data of each joint point obtained by the master camera is expressed as the three-dimensional position vector of each joint point obtained by the master camera), and then data filtering and fusion processing is performed based on the initial data of each joint point obtained by each Azure Kinect DK camera. During the data filtering and fusion processing, the initial data of each joint point obtained by each Azure Kinect DK camera is classified and processed by using the Mahalanobis distance. When the square of the Mahalanobis distance between the initial data of a joint point obtained by the slave camera and the initial data of the corresponding joint point obtained by the master camera exceeds a set confidence threshold, it means that the measurement information of the two Azure Kinect DK cameras is inconsistent, indicating that one of the Azure Kinect DK cameras may have occlusion. In this case, we further measure the square of the Mahalanobis distance between the predicted global three-dimensional position vector of the corresponding joint point and the initial data of the corresponding joint point obtained by each Azure Kinect DK camera, thereby filtering out the camera affected by visual occlusion. If the square of the Mahalanobis distance between the predicted global three-dimensional position vector of the corresponding joint point and the initial data of the corresponding joint point obtained by the Azure Kinect DK camera filtered out is too large, it means that the Azure Kinect DK camera filtered out is greatly affected by occlusion and the measurement information of that Azure Kinect DK camera is unreliable, thereby rejecting the fusion of the initial data of the corresponding joint point obtained by that Azure Kinect DK camera to avoid influence on the final result. If the square of the Mahalanobis distance between the predicted global three-dimensional position vector of the corresponding joint point and the initial data of the corresponding joint point obtained by the Azure Kinect DK camera filtered out is less than the confidence threshold, the initial data of the corresponding joint point obtained by the Azure Kinect DK camera filtered out is guided by the initial data of the corresponding joint point obtained by the other Azure Kinect DK camera to perform progressive filter fusion, and the stop of progressive filter iteration is controlled by determination variables to achieve the effect of implicit compensation. Finally, the initial data of corresponding joint points obtained by different Azure Kinect DK cameras are fully utilized to globally fuse the local estimation results obtained after local filtering on each Azure Kinect DK camera, thereby further improving the accuracy of human pose estimation. Therefore, in view of the large amount of information data and complex processing in visual human motion estimation, the present invention builds a system architecture including a multi-vision data acquisition module, a data synchronization and preprocessing module, and a core computing and fusion module, and implements a distributed multi-view fusion human motion estimation solution based on the system architecture, thereby reducing the requirements for storage, computing and transmission capabilities. This distributed structure will be conducive to the rational utilization of resources and the alleviation of network transmission pressure. In order to solve the problems of non-synchronization and low accuracy of multi-sensor data caused by visual occlusion and network delay, data filtering and fusion is divided into three sub-steps: one is spatio-temporal synchronization of multiple vision data, one is the consistency determination and compensation of visual motion estimation, and the other is the design of a distributed state fusion estimator, and the multi-view human motion estimates are finally fused to form a more accurate, consistent and complete human motion estimation. Therefore, the present invention greatly reduces the cost, has low cost and high accuracy, does not require testers to wear joint point markers, and does not cause inconvenience to the testers.

DETAILED DESCRIPTION OF THE EMBODIMENTS

The present disclosure is further described below in conjunction with accompanying drawings and embodiments.

Figure 1:
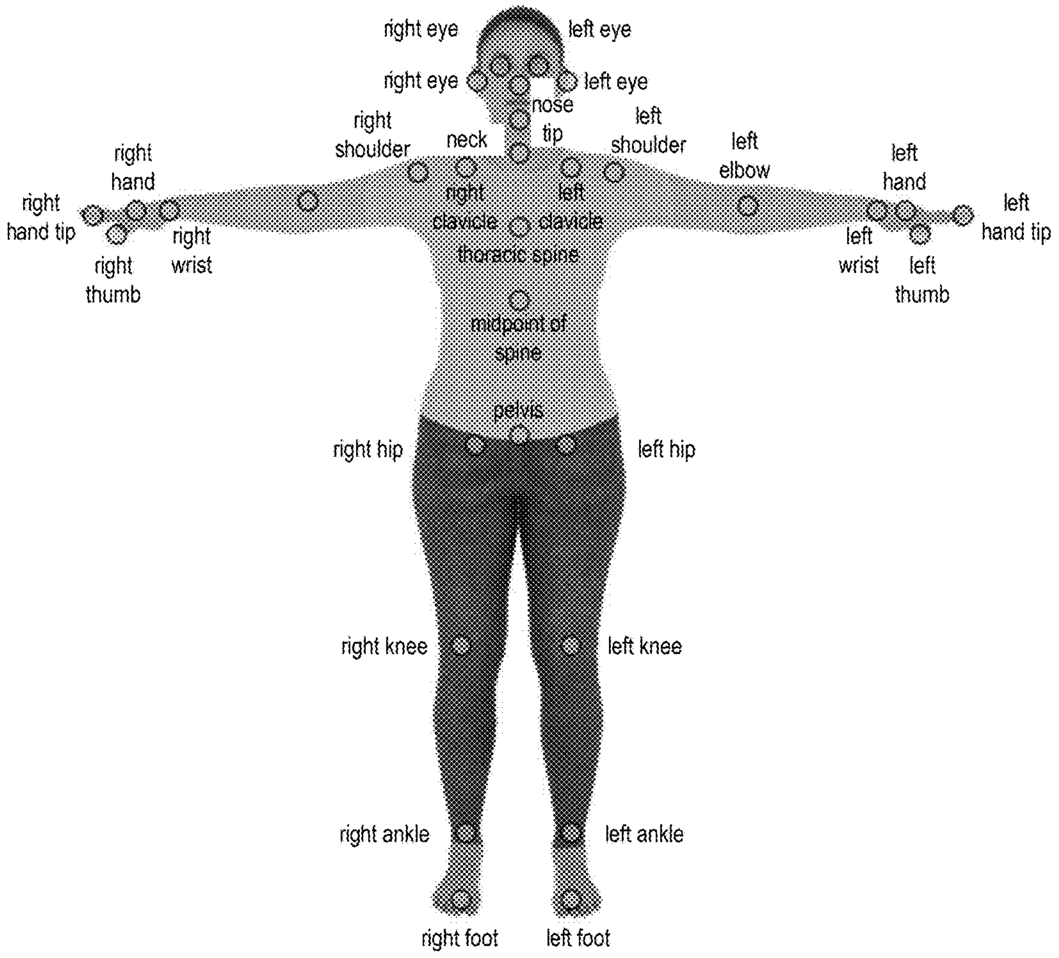
FIG. 1 shows a hierarchical structure of human skeleton joints acquired by an Azure Kinect DK camera.
Figure 2:
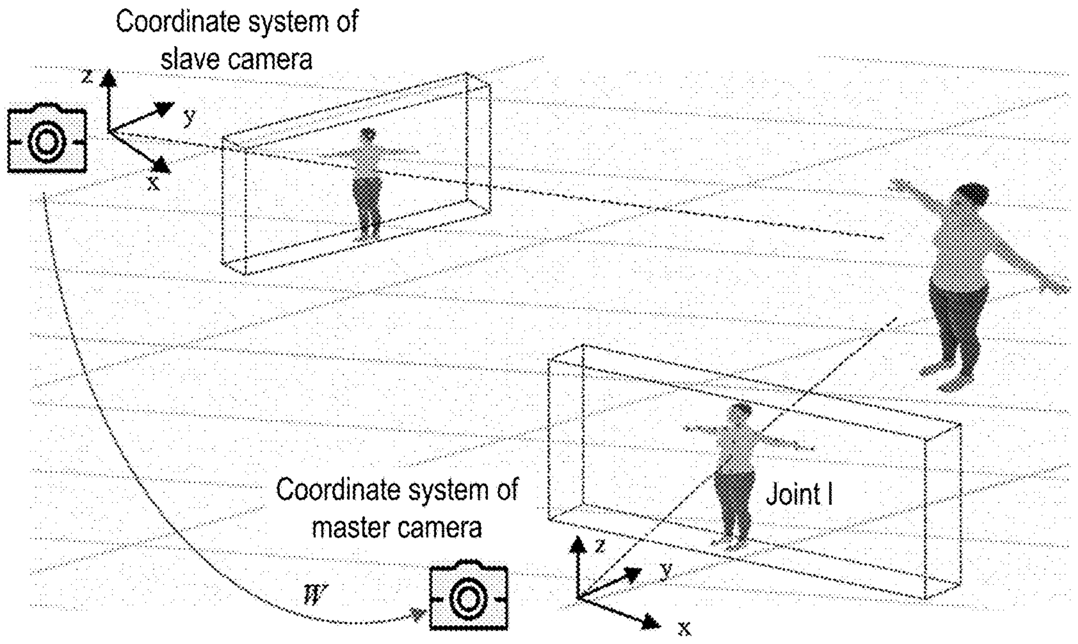
FIG. 2 shows a schematic scene device layout of a multi-view fusion human motion estimation method based on distributed progressive Gaussian filtering according to the present invention.
Figure 3:
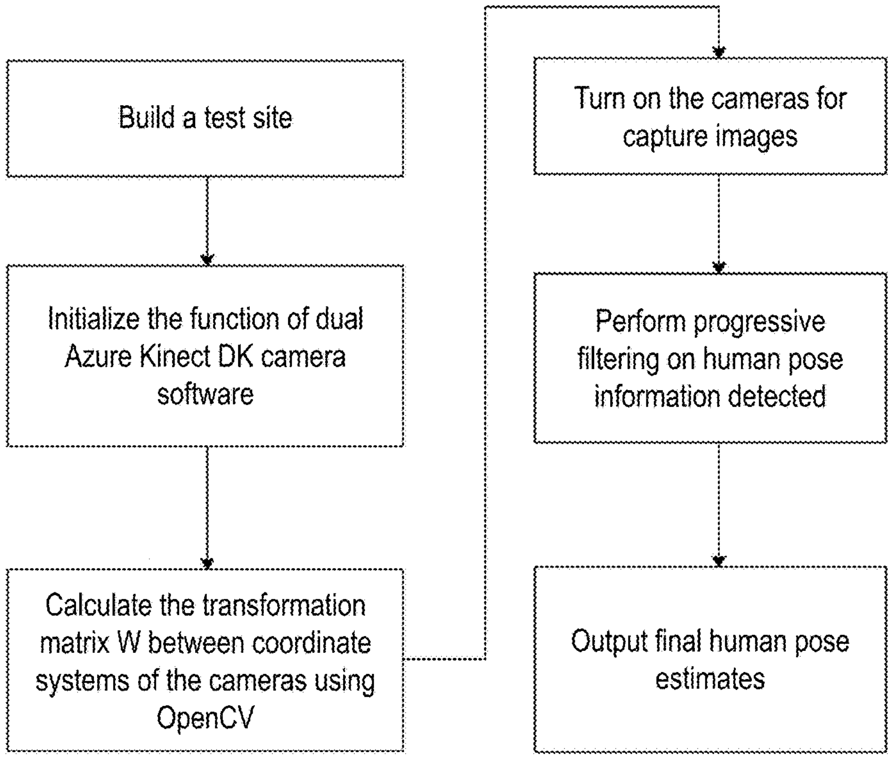
FIG. 3 shows a schematic flow block diagram of the multi-view fusion human motion estimation method based on distributed progressive Gaussian filtering according to the present invention.

Embodiment: As shown in FIG. 2, a multi-view fusion human motion estimation method based on distributed progressive Gaussian filtering is provided. The method runs in a system architecture including a multi-vision data acquisition module, a data synchronization and preprocessing module, and a core computing and fusion module, and includes the following steps:

Step 1. acquiring initial data by using a multi-vision data acquisition module, as shown in FIG. 3, where the multi-vision data acquisition module includes a test bench, two Azure Kinect DK cameras, and a checkerboard calibration board with a square length of 10 mm and a 8*6 pattern array; specifically, S1.1. placing the two Azure Kinect DK cameras on the test bench, where the two Azure Kinect DK cameras are on the same horizontal plane with a field of view overlap rate reaching 80% or above, and the fields of view of both the two Azure Kinect DK cameras completely cover a tester in the center of the test bench; and S1.2. letting the tester stand upright in the center of the test bench with two hands holding a checkerboard calibration plate with a square length of 10 mm and a 8*6 pattern array, so that a checkerboard pattern on the front of the 8*6 checkerboard calibration plate is clearly seen by the two Azure Kinect DK cameras;

step 2. performing data synchronize and preprocessing by using the data synchronization and preprocessing module; specifically, S2.1. firstly, turning on the two Azure Kinect DK cameras at the same time to take one frame of color image data, and then turning off the two Azure Kinect DK cameras; then, the data synchronization and preprocessing module acquiring the one frame of color image data captured by each of the two Azure Kinect DK cameras, thus obtaining two frames of color image data currently, where nanosecond clock synchronization is realized by an IEEE 1588v2 (PTP) protocol or a dedicated synchronization chip, thereby achieving spatio-temporal alignment of the data of the two Azure Kinect DK cameras;

S2.2. processing the two frames of color image data by using an OpenCV software toolkit pre-stored in the data synchronization and preprocessing module to obtain a coordinate system transformation matrix between the two Azure Kinect DK cameras, denoted as W;

S2.3. removing the checkerboard calibration board from the tester, and then letting the tester enter a ready state;

S2.4. letting the tester to do test actions and at the same time starting the two Azure Kinect DK cameras simultaneously to film videos until the tester completes all the test actions, and after the two Azure Kinect DK cameras completes the video filming and output the videos to the data synchronization and preprocessing module, turning off the two Azure Kinect DK cameras, where each frame of data in the video filmed by each Azure Kinect DK camera includes image data and human skeleton data corresponding to the image data, the human skeleton data includes the three-dimensional position vectors of 32 human skeleton joint points in the coordinate system of the Azure Kinect DK camera, the 32 human skeleton joint points are pelvis, spine, thoracic spine, neck, left clavicle, left shoulder, left elbow, left wrist, left hand, left hand tip, left thumb, right clavicle, right shoulder, right elbow, right wrist, right hand tip, right thumb, left hip, left knee, left ankle, left foot, right hip, right knee, right ankle, right foot, head, nose, left eye, left ear, right eye and right ear; numbering the pelvis, spine, thoracic spine, neck, left clavicle, left shoulder, left elbow, left wrist, left hand, left hand tip, left thumb, right clavicle, right shoulder, right elbow, right wrist, right hand, right hand tip, right thumb, left hip, left knee, left ankle, left foot, right hip, right knee, right ankle, right foot, head, nose, left eye, left ear, right eye and right ear in order from 1 to 32, respectively, where the human skeleton joint point numbered l is called joint point l, l=1, 2, . . . , 32; denoting the total number of frames of data in the video filmed by each of the two Azure Kinect DK cameras as Y (that is, each Azure Kinect DK camera obtains Y frames of data respectively); the three-dimensional position vectors of 32 human skeleton joint points in the coordinate system of each Azure Kinect DK camera being the measurement information of the Azure Kinect DK camera, where the hierarchical structure of 32 human skeleton joint points is shown in FIG. 1; and S2.5. at the data synchronization and preprocessing module, setting any one of the two Azure Kinect DK cameras as a master camera and the other as a slave camera; multiplying the three-dimensional position vector of joint point l in an a-th frame of data obtained by the slave camera by the coordinate system transformation matrix W to obtain a mapping vector of the joint point l in the coordinate system of the master camera, which is called the mapping vector of the joint point l and is denoted as $$z_{l,a}^{s},$$

where the three-dimensional position vector of joint point l in a a-th frame of data obtained by the master camera is denoted as $$z_{l,a}^{m},$$

a=1, 2, . . . , Y; realizing spatio-temporal synchronization of data from the two Azure Kinect DK cameras by the coordinate system transformation matrix W, IEEE 1588v2 (PTP) protocol or a dedicated synchronization chip; the data synchronization and preprocessing module outputting the obtained data to a core computing and fusion module; and Step 3. in the core computing and fusion module, firstly, setting a global three-dimensional position vector estimate of the joint point l of the a-th frame data as $$\hat{x}_{l,a|a}^{f},$$

and setting the uncertainty value of $$\hat{x}^{f}_{l,a|a}$$

as a covariance matrix $$P^{f}_{l,a|a};$$

initializing the global three-dimensional position vector estimate $$\hat{x}^{f}_{l,1|1}$$

of the joint point l of the first frame of data, letting $$\hat{x}^{f}_{l,1|1} = (z^{m}_{l,1} + z^{s}_{l,1})/2,$$

initializing the covariance matrix $$P^{f}_{l,1|1}$$

of $$\hat{x}^{f}_{l,1|1},$$

letting $$P^{f}_{l,1|1} = 3 * 3$$

unit matrix which is denoted as I; setting a measurement noise covariance of $$z^{m}_{l,a}$$

as $$R^{m}_{a}$$

and letting $$R^{m}_{a} = 3 * I;$$

setting a measurement noise covariance of $$z^{s}_{l,a}$$

as $$R^{s}_{a}$$

and letting $$R^{s}_{a} = 3 * I;$$

setting a measurement matrix of any human skeleton joint point in the a-th frame of data as $H_a$ and letting $H_a$=I, where * is the symbol of multiplication; and then, performing data filtering and fusion processing operations at the core computing and fusion module; specifically: S3.1. setting a frame number variable as k, and initializing k and letting k=2;

S3.2. processing the three-dimensional position vector $$z^{m}_{l,k}$$

of the joint point l in the k-th data obtained by the master camera and the mapping vector $$z^{s}_{l.k}$$

of the joint point l obtain the global three-dimensional position vector estimate $$\hat{x}^{f}_{l,k|k}$$

of the john point l in the k-th frame of data; specifically,

S3.2.1. setting a state transition matrix of the k-th frame of data as $F_k$, and letting $F_k$=1; setting a process noise covariance matrix of the k-th frame of data as $Q_k$, and letting $Q_k$=0.2*I; setting a predicated global three-dimensional position vector of the joint point l in the k-th frame of data as $$\hat{x}^{f}_{l,k|k-1};$$

setting the covariance matrix $$\hat{x}^{f}_{l,k|k-1}$$

of $$P^{f}_{l,k|k-1};$$

as

S3.2.2. calculating $$\hat{x}^{f}_{l,k|k-1} \text{ and } P^{f}_{l,k|k-1}$$

using Equations (1) and (2):

$$\hat{x}^f_{l,k|k-1} = F_k * \hat{x}^f_{l,k-1|k-1} \tag{1}$$

$$P^f_{l,k|k-1} = F_k * P^f_{l,k-1|k-1} * F_k^T + Q_k \tag{2}$$

in Equation (2), corner mark T represents the transpose symbol of the matrix;

S3.2.3. setting the square of Mahalanobis distance between $$z^s_{l,k} \text{ and } z^m_{l,k}$$

as $$\gamma(z^s_{l,k}, z^m_{l,k}),$$

and calculating $$\gamma(z^s_{l,k}, z^m_{l,k})$$

using Equation (3);

$$\gamma(z^s_{l,k}, z^m_{l,k}) = (z^s_{l,k} - z^m_{l,k})^T * \Sigma^{-1}_{zz} * (z^s_{l,k} - z^m_{l,k}) \tag{3}$$

in Equation (3), $$\Sigma^{-1}_{zz} = (R^s_k + R^m_k)^{-1};$$

S3.2.4. setting the square of Mahalanobis distance between $$z^s_{l,k} \text{ and } H_k * \hat{x}^f_{l,k|k-1}$$

as $$\gamma(z^s_{l,k}, H_k * \hat{x}^f_{l,k|k-1}),$$

setting the square of Mahalanobis distance between $$z^m_{l,k} \text{ and } H_k * \hat{x}^f_{l,k|k-1}$$

as $$\gamma(z^m_{l,k}, H_k * \hat{x}^f_{l,k|k-1}),$$

and calculating $$\gamma(z^s_{l,k}, H_k * \hat{x}^f_{l,k|k-1}) \text{ and } \gamma(z^m_{l,k}, H_k * \hat{x}^f_{l,k|k-1})$$

respectively using Equations (4) and (5):

$$\gamma(z^s_{l,k}, H_k * \hat{x}^f_{l,k|k-1}) = (z^s_{l,k} - H_k * \hat{x}^f_{l,k|k-1})^T * \Sigma^{-1}_{sz} * (z^s_{l,k} - H_k * \hat{x}^f_{l,k|k-1}) \tag{4}$$

$$\gamma(z^m_{l,k}, H_k * \hat{x}^f_{l,k|k-1}) = (z^m_{l,k} - H_k * \hat{x}^f_{l,k|k-1})^T * \Sigma^{-1}_{mz} * (z^m_{l,k} - H_k * \hat{x}^f_{l,k|k-1}) \tag{5}$$

in equation (4), $$\Sigma^{-1}_{sz} = (R^s_k + H_k * P^f_{l,k|k-1} * H_k^T)^{-1},$$

and in equation (5)

$$\sum\nolimits^{-1}_{mz} = (R^m_k + H_k * P^f_{l,k|k-1} * H_k^T)^{-1};$$

S3.2.5. setting a confidence threshold of joint point l as $\chi_1$, where the value of $\chi_1$ is not less than 10 but not greater than 20;

S3.2.6. comparing $$\gamma(z^s_{l,k}, z^m_{l,k}),\ \gamma(z^s_{l,k}, H_k * \hat{x}^f_{l,k|k-1}) \text{ and } \gamma(z^m_{l,k}, H_k * \hat{x}^f_{l,k|k-1})$$

with $\chi_1$ respectively and then performing data processing based on the comparison results respectively; specifically, when the comparison results satisfy $$\gamma(z^s_{l,k}, z^m_{l,k}) < \chi_l, \text{ or } \gamma(z^s_{l,k}, H_k * \hat{x}^f_{k|k-1}) < \chi_l \text{ and}$$
$$\gamma(z^m_{l,k}, H_k * \hat{x}^f_{k|k-1}) < \chi_l,$$

the processing process including:

A1. calculating a local three-dimensional position vector estimate $$\hat{x}^s_{l,k|k}$$

of joint point l in the k-th frame of data obtained by the slave camera and the covariance matrix $$P^s_{l,k|k}$$

of $$\hat{x}^s_{l,k|k}$$

respectively using Equations (6), (7) and (8):

$$\hat{x}^{s}_{l,k|k}=\hat{x}^{f}_{l,k|k-1}+K^{s}_{k}*(z^{s}_{l,k}-H_{k}*\hat{x}^{f}_{l,k|k-1}) \tag{6}$$

$$K^{s}_{k}=P^{f}_{l,k|k-1}*H^{T}_{k}*(H_{k}*P^{f}_{l,k|k-1}*H^{T}_{k}+R^{s}_{k})^{-1} \tag{7}$$

$$P^{s}_{l,k|k}=(I-K^{s}_{k}*H_{k})*P^{f}_{l,k|k-1} \tag{8}$$

A2. calculating a local three-dimensional position vector estimate $$\hat{x}^{m}_{l,k|k}$$

of joint point l in the k-th frame of data obtained by the master camera and the covariance matrix $$P^{m}_{l,k|k}$$

of $$\hat{x}^{m}_{l,k|k}$$

respectively using Equations (9), (10) and (11):

$$\hat{x}^{m}_{l,k|k}=\hat{x}^{f}_{l,k|k-1}+K^{m}_{k}*(z^{m}_{l,k}-H_{k}*\hat{x}^{f}_{l,k|k-1}) \tag{9}$$

$$K^{m}_{k}=P^{f}_{l,k|k-1}*H^{T}_{k}*(H_{k}*P^{f}_{l,k|k-1}*H^{T}_{k}+R^{m}_{k})^{-1} \tag{10}$$

$$P^{m}_{l,k|k}=(I-K^{m}_{k}*H_{k})*P^{f}_{l,k|k-1} \tag{11}$$

A3. entering step S3.2.7;

when the comparison results satisfy $$\gamma(z^{s}_{l,k},z^{m}_{l,k})\geq\chi_{l}\text{ and }\gamma(z^{s}_{l,k},H_{k}*\hat{x}^{f}_{k|k-1})<\chi_{l}\text{ and }\chi_{l}\leq\gamma(z^{m}_{l,k},H_{k}*\hat{x}^{f}_{k|k-1}),$$

the processing process specifically including:

B1. calculating the local three-dimensional position vector estimate $$\hat{x}^{s}_{l,k|k}$$

of joint point l in the k-th frame of data obtained by the slave camera and the covariance matrix $$P^{s}_{l,k|k}$$

of $$\hat{x}^{s}_{l,k|k}$$

respectively using Equations (6), (7) and (8):

B2. determining whether $$\gamma(z^{m}_{l,k},H_{k}*\hat{x}^{f}_{k|k-1})\geq 2*\chi_{l}$$

is established; if so, letting $$\hat{x}^{m}_{l,k|k}=\hat{x}^{f}_{l,k|k-1}\text{ and }P^{m}_{l,k|k}=P^{f}_{l,k|k-1};$$

then, entering step S3.2.7; if not, continuing to perform progressive filtering on the three-dimensional position vector $$z^{m}_{l,k}$$

of the joint point l in the k-th frame of data acquired by the master camera; specifically, the progressive filtering process including:

B2.1. setting the iteration variable of progressive filtering as t, setting the maximum number M of iteration steps as M=10, and setting state variables in the progressive filtering as $$\hat{x}^{m,0}_{l,k|k},\hat{P}^{m,0}_{l,k|k};$$

B2.2. initializing t, and letting t=1; initializing $$\hat{x}^{m,0}_{l,k|k}\text{ and }\hat{P}^{m,0}_{l,k|k},$$

and letting $$\hat{x}^{m,0}_{l,k|k}=\hat{x}^{f}_{l,k|k-1},\hat{P}^{m,0}_{l,k|k}=P^{f}_{l,k|k-1};$$

and

B2.3. performing a t-th iteration of filtering; specifically,

B2.3.1. calculating the intermediate state variable $$\hat{x}^{m,t}_{l,k|k}$$

of the t-th iteration, the intermediate state covariance matrix $$P^{m,t}_{l,k|k}$$

of the t-th iteration, and the intermediate determination variable $$\varphi_k^{m,t}$$

of the t-th iteration using Equations (12) to (16):

$$(P_{l,k|k}^{m,t})^{-1}*\hat{x}_{l,k|k}^{m,t}=(P_{l,k|k}^{m,t-1})^{-1}*\hat{x}_{l,k|k}^{m,t-1}+(H_k)^T*(M*R_k^m)^{-1}*z_{l,k}^m \quad (12)$$

$$(P_{l,k|k}^{m,t})^{-1}=(P_{l,k|k}^{m,t-1})^{-1}+(H_k)^T*(M*R_k^m)^{-1}*H_k \quad (13)$$

$$\varphi_k^{m,t}=\gamma(z_{l,k}^s,H_k*\hat{x}_{l,k|k}^{m,t})-\gamma(z_{l,k}^s,H_k*\hat{x}_{l,k|k}^{m,t-1}) \quad (14)$$

$$\gamma(z_{l,k}^s,H_k*\hat{x}_{l,k|k}^{m,t})=(z_{l,k}^s-H_k*\hat{x}_{l,k|k}^{m,t})^T*\sum\nolimits_{sm,t}^{-1}*(z_{l,k}^s-H_k*\hat{x}_{l,k|k}^{m,t}) \quad (15)$$

$$\gamma(z_{l,k}^s,H_k*\hat{x}_{l,k|k}^{m,t-1})=(z_{l,k}^s-H_k*\hat{x}_{l,k|k}^{m,t-1})^T*\sum\nolimits_{sm,t}^{-1}*(z_{l,k}^s-H_k*\hat{x}_{l,k|k}^{m,t-1}) \quad (16)$$

in the above equations, $$\sum\nolimits_{sm,t}^{-1}=(R_k^s+H_k*P_{l,k|k}^{m,t}*H_k^T)^{-1},\ \sum\nolimits_{sm,t-1}^{-1}=(R_k^s+H_k*P_{l,k|k}^{m,t-1}*H_k^T)^{-1};$$

and

B2.3.2. determining whether $$\varphi_k^{m,t}>0$$

is established; if so letting $$\hat{x}_{l,k|k}^m=\hat{x}_{l,k|k}^{m,t},\ P_{l,k|k}^m=P_{l,k|k}^{m,t},$$

and then, entering step S3.2.7; if not, further determining whether the current value of t is equal to M; if not, updating the value of t with the current value of t plus 1, and then returning to step C2.3 for next iteration of filtering; and if so, letting $$\hat{x}_{l,k|k}^m=\hat{x}_{l,k|k}^{m,M},\ P_{l,k|k}^m=P_{l,k|k}^{m,M},$$

and then entering step S3.2.7; and when the comparison results satisfy $$\gamma(z_{l,k}^s,z_{l,k}^m)\geq\chi_l \text{ and } \gamma(z_{l,k}^m,H_k*\hat{x}_{k|k-1}^f)<\chi_l \text{ and}$$
$$\chi_l\leq\gamma(z_{l,k}^s,H_k*\hat{x}_{k|k-1}^f),$$

the processing process specifically including:

C1. calculating the local three-dimensional position vector estimate $$\hat{x}_{l,k|k}^m$$

of joint point l in the k-th frame of data acquired by the master camera and the covariance matrix $$P_{l,k|k}^m$$

of $$\hat{x}_{l,k|k}^m$$

respectively using Equations (9), (10) and (11):

C2. determining whether $$\gamma(z_{l,k}^s,H_k*\hat{x}_{k|k-1}^f)\geq 2*\chi_l$$

is established; if so, letting $$\hat{x}_{l,k|k}^s=\hat{x}_{l,k|k-1}^f \text{ and } P_{l,k|k}^s=P_{l,k|k-1}^f;$$

then, entering step S3.2.7; if not, continuing to perform progressive filtering on the mapping vector $$z_{l,k}^s$$

of the joint point l in the k-th frame of data acquired by the slave camera; specifically, the progressive filtering process including:

C2.1. setting the iteration variable of progressive filtering asn, setting the maximum number N of iteration steps as N=10, and setting state variables in the progressive filtering as $$\hat{x}_{l,k|k}^{s,0},\ \hat{P}_{l,k|k}^{s,0};$$

and

C2.2. initializing n and letting n=1; initializing $$\hat{x}_{l,k|k}^{s,0} \text{ and } \hat{P}_{l,k|k}^{s,0},$$

and letting $$\hat{x}_{l,k|k}^{s,0}=\hat{x}_{l,k|k-1}^f,\ \hat{P}_{l,k|k}^{s,0}=P_{l,k|k-1}^f;$$

and

C2.3. performing an n-th iteration of filtering; specifically,

C2.3.1. calculating the intermediate state variable $$\hat{x}_{l,k|k}^{s,n},$$

intermediate state covariance matrix $$P^{s,n}_{l,k|k}$$

and intermediate determination variable $$\varphi_k^{s,n}$$

of the n-th iteration of progressive filtering in the slave camera using Equations (17) to (21):

$$\left(P^{s,n}_{l,k|k}\right)^{-1} * \hat{x}^{s,n}_{l,k|k} = \left(P^{s,n-1}_{l,k|k}\right)^{-1} * \hat{x}^{s,n-1}_{l,k|k} + (H_k)^T * (N * R^s_k)^{-1} * z^s_{l,k} \tag{17}$$

$$\left(P^{s,n}_{l,k|k}\right)^{-1} = \left(P^{s,n-1}_{l,k|k}\right)^{-1} + (H_k)^T * (N * R^s_k)^{-1} * H_k \tag{18}$$

$$\varphi_k^{s,n} = \gamma\left(z^m_{l,k}, H_k * \hat{x}^{s,n}_{l,k|k}\right) - \gamma\left(z^m_{l,k}, H_k * \hat{x}^{s,n-1}_{l,k|k}\right) \tag{19}$$

$$\gamma\left(z^m_{l,k}, H_k * \hat{x}^{s,n}_{l,k|k}\right) = \left(z^m_{l,k} - H_k * \hat{x}^{s,n}_{l,k|k}\right)^T * \sum\nolimits^{-1}_{ms,n} * \left(z^m_{l,k} - H_k * \hat{x}^{s,n}_{l,k|k}\right) \tag{20}$$

$$\gamma\left(z^m_{l,k}, H_k * \hat{x}^{s,n-1}_{l,k|k}\right) = \left(z^m_{l,k} - H_k * \hat{x}^{s,n-1}_{l,k|k}\right)^T * \sum\nolimits^{-1}_{ms,n-1} * \left(z^m_{l,k} - H_k * \hat{x}^{s,n-1}_{l,k|k}\right) \tag{21}$$

in the above equations, $$\sum\nolimits^{-1}_{ms,n} = \left(R^m_k + H_k * P^{s,n}_{l,k|k} * H^T_k\right)^{-1}, \sum\nolimits^{-1}_{ms,n-1} = \left(R^m_k + H_k * P^{s,n-1}_{l,k|k} * H^T_k\right)^{-1};$$

and

C2.3.2. determining whether $$\varphi_k^{s,n} > 0$$

is established; if so, letting $$\hat{x}^s_{l,k|k} = \hat{x}^{s,n}_{l,k|k}, P^s_{l,k|k} = P^{s,n}_{l,k|k},$$

and then, entering step S3.2.7; if not, further determining whether the current value of n is equal to N; if not, updating the value of n with the current value of n plus 1, and then returning to step B2.3 for next iteration; and if so, letting $$\hat{x}^s_{l,k|k} = \hat{x}^{s,N}_{l,k|k}, P^s_{l,k|k} = P^{s,N}_{l,k|k},$$

and then entering step S3.2.7;

when comparison results satisfy $$\gamma\left(z^s_{l,k}, z^m_{l,k}\right) \geq \chi_l \text{ and } \gamma\left(z^s_{l,k}, H_k * \hat{x}^f_{k|k-1}\right) \geq \chi_l \text{ and}$$
$$\gamma\left(z^m_{l,k}, H_k * \hat{x}^f_{k|k-1}\right) \geq \chi_l,$$

directly letting $$\hat{x}^s_{l,k|k} = \hat{x}^f_{l,k|k-1}, P^s_{l,k|k} = P^f_{l,k|k-1}, \hat{x}^m_{l,k|k} = \hat{x}^f_{l,k|k-1}, P^m_{l,k|k} = P^f_{l,k|k-1}$$

and then entering step S3.2.7;

S3.2.7. calculating the global three-dimensional position vector estimate $$\hat{x}^f_{l,k|k}$$

of joint point l in the k-th frame of data obtained and the covariance matrix $$P^f_{l,k|k}$$

of $$\hat{x}^f_{l,k|k}$$

respectively using Equations (22) and (23); and $$P^f_{l,k|k} = \left[\left(P^s_{l,k|k}\right)^{-1} + \left(P^m_{l,k|k}\right)^{-1} - \left(P^f_{l,k|k-1}\right)^{-1}\right]^{-1} \tag{22}$$

$$\hat{x}^f_{l,k|k} = P^f_{l,k|k} * \left[\left(P^s_{l,k|k}\right)^{-1} * \hat{x}^s_{l,k|k} + \left(P^m_{l,k|k}\right)^{-1} * \hat{x}^m_{l,k|k} - \left(P^f_{l,k|k-1}\right)^{-1} * \hat{x}^f_{l,k|k-1}\right] \tag{23}$$

S3.3. determining whether the current value of k is equal to Y; if not, updating the value of k with the current value of k plus 1, and then returning to step S3.2 for processing a next frame of data; if so, ending the human pose estimation, with $$\hat{x}^f_{1,1|1}, \ldots, \hat{x}^f_{32,1|1}, \hat{x}^f_{1,2|2}, \ldots, \hat{x}^f_{32,2|2}, \ldots, \hat{x}^f_{1,Y|Y} \ldots, \hat{x}^f_{32,Y|Y}$$

being regarded as the obtained human pose data.

In this embodiment, the data synchronization and preprocessing module is implemented by using a QX550 network card in combination with a PSB (Platform Sync Board) module.

In this embodiment, the core computing and fusion module is implemented using embedded AI computers (NVIDIA Jetson AGX Orin and Xilinx FPGA) and field programmable gate array products (Xilinx FPGA).

In this embodiment, first, consistency between multi-view human motion data is detected by steps S3.2.3 to sub-steps A1 and A2 in S3.2.6, and then multi-view human motion data is fused by sub-steps B1 and B2 and sub-steps C1 and C2, thus achieving accurate, consistent and complete human motion estimation.

In this embodiment, first, the difference between human motion measurements at different angles of view (i.e., the difference between $$z^s_{l,k} \text{ and } z^m_{l,k})$$

is defined from the spatial dimension by step S3.2.3, and then differences between human motion prediction and measurement at the same angle of view (i.e., the difference between $$z^m_{l,k} \text{ and } H_k * \hat{x}^f_{k|k-1}$$

and the difference between $$z^s_{l,k} \text{ and } H_k * \hat{x}^f_{k|k-1})$$

are defined from the temporal dimension by step S3.2.4. In this way, this embodiment provides a spatio-temporal consistency detection method to refine the classification of human motion estimation results at different angles of view. When the differences in spatial and temporal dimensions are less than the thresholds, multi-view human motion data fusion is achieved by sub-step A1. When the difference in spatial dimension is greater than the threshold and the difference at an angle of view in the temporal dimension is greater than the threshold, compensation and fusion of multi-view human motion data are realized by sub-steps B1 and B2 (or sub-steps C1 and C2). In particular, a novel compensation strategy in progressive form is provided, and view data with large differences is compensated by sub-step B2 (sub-step C2), thereby realizing the fusion of multi-view human motion data. When the differences in spatial and temporal dimensions are greater than the thresholds, the predicted values of human motion are used as human motion estimates. That is, directly let $$\hat{x}^s_{l,k|k} = \hat{x}^f_{l,k|k-1},\ P^s_{l,k|k} = P^f_{l,k|k-1},\ \hat{x}^m_{l,k|k} = \hat{x}^f_{l,k|k-1}, \text{ and } P^m_{l,k|k} = P^f_{l,k|k-1}.$$

Finally, by means of a classification and refinement processing solution based on consistency detection, the accuracy, consistency and integrity of human motion estimation are improved.

Figure 4:
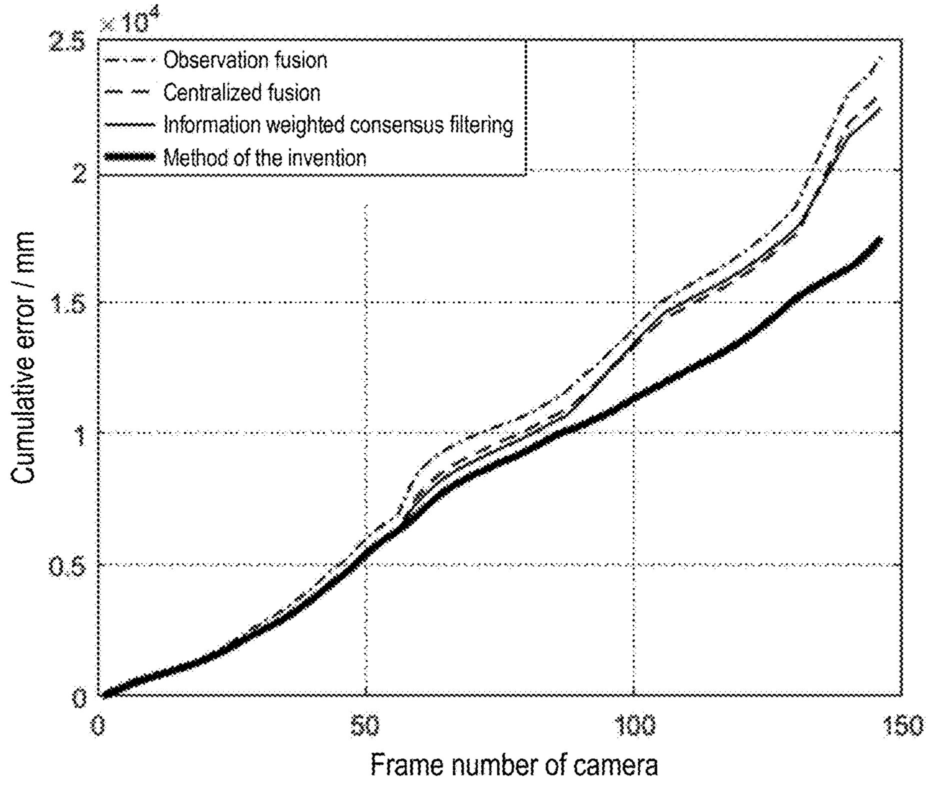
FIG. 4 shows comparison of position errors between the method of the present invention and the conventional method in the same experimental environment.

In order to verify the rationality and effectiveness of the multi-view fusion human motion estimation method based on distributed progressive Gaussian filtering of the present invention, a human pose estimation experiment in an environment composed of two Azure Kinect DK cameras is designed. The process of the experiment specifically refers to steps S1.1-S3.3 of the multi-view fusion human motion estimation method based on distributed progressive Gaussian filtering of the present invention. In addition, by using the detected human pose from an OptiTrack human motion capture system as a true value, and the cumulative position errors between the human pose estimates under different methods and the true value as measurement standards, the multi-view fusion human motion estimation method based on distributed progressive Gaussian filtering of the present invention, a human motion estimation method based on observation fusion disclosed in the existing report "Multiple Kinect Sensor Fusion for Human Skeleton Tracking Using Kalman Filtering" and a human motion estimation method based on centralized fusion and a human motion estimation method based on information-weighted consensus filtering disclosed in "Human Action Recognition Using a Distributed RGB-Depth Camera Network" are experimentally compared. The experimental results are shown in FIG. 4. By analyzing FIG. 4, it can be seen that when Y=146, the cumulative error of the multi-view fusion human motion estimation method based on distributed progressive Gaussian filtering of the present invention is 17.44 meters, the cumulative error of the human motion estimation method based on information weighted consensus filtering is 22.36 meters, the cumulative error of the human motion estimation method based on centralized fusion is 22.75 meters, and the cumulative error of the human motion estimation method based on observation fusion is 24.3 meters. It can be learnt that compared with the three conventional human motion estimation methods, the multi-view fusion human motion estimation method based on distributed progressive Gaussian filtering of the present invention reduces the cumulative error by 4.92 to 6.86 meters and improves the accuracy.

The invention claimed is:

1. A multi-view fusion human motion estimation method based on distributed progressive Gaussian filtering, the multi-view fusion human motion estimation method runs in a system architecture including a multi-vision data acquisition module, a data synchronization and preprocessing module, and a core computing and fusion module, characterized by comprising following steps:

step 1. acquiring initial data by using the multi-vision data acquisition module, where the multi-vision data acquisition module includes a test bench, two Azure Kinect DK cameras, and a checkerboard calibration board with a square length of 10 mm and a 8*6 pattern array, wherein the step 1 comprises:

S1.1. placing the two Azure Kinect DK cameras on the test bench, where the two Azure Kinect DK cameras are on the same horizontal plane with a field of view overlap rate reaching 80% or above, and the fields of view of both the two Azure Kinect DK cameras completely cover a tester in the center of the test bench; and S1.2. letting the tester stand upright in the center of the test bench with two hands holding a checkerboard calibration plate with a square length of 10 mm and a 8*6 pattern array, so that a checkerboard pattern on the front of the 8*6 checkerboard calibration plate is clearly seen by the two Azure Kinect DK cameras;

step 2. performing data synchronize and preprocessing by using the data synchronization and preprocessing module, wherein the step 2 comprises:

S2.1. firstly, turning on the two Azure Kinect DK cameras at the same time to take one frame of color image data, and then turning off the two Azure Kinect DK cameras; then, the data synchronization and preprocessing module acquiring the one frame of color image data captured by each of the two Azure Kinect DK cameras, thus obtaining two frames of color image data currently, where nanosecond clock synchronization is realized by an IEEE 1588v2 (PTP) protocol or a dedicated synchronization chip, thereby achieving spatio-temporal alignment of the data of the two Azure Kinect DK cameras;

S2.2. processing the two frames of color image data by using an OpenCV software toolkit pre-stored in the data synchronization and preprocessing module to obtain a coordinate system transformation matrix between the two Azure Kinect DK cameras, denoted as W;

S2.3. removing the checkerboard calibration board from the tester, and then letting the tester enter a ready state;

S2.4. letting the tester to do test actions and at the same time turning on the two Azure Kinect DK cameras simultaneously to film videos until the tester completes all the test actions, and after the two Azure Kinect DK cameras completes the video filming and output the videos to the data synchronization and preprocessing module, turning off the two Azure Kinect DK cameras, where each frame of data in the video filmed by each Azure Kinect DK camera includes image data and human skeleton data corresponding to the image data, the human skeleton data includes three-dimensional position vectors of 32 human skeleton joint points in a coordinate system of the Azure Kinect DK camera, the 32 human skeleton joint points are pelvis, spine, thoracic spine, neck, left clavicle, left shoulder, left elbow, left wrist, left hand, left hand tip, left thumb, right clavicle, right shoulder, right elbow, right wrist, right hand tip, right thumb, left hip, left knee, left ankle, left foot, right hip, right knee, right ankle, right foot, head, nose, left eye, left ear, right eye and right ear; numbering the pelvis, spine, thoracic spine, neck, left clavicle, left shoulder, left elbow, left wrist, left hand, left hand tip, left thumb, right clavicle, right shoulder, right elbow, right wrist, right hand, right hand tip, right thumb, left hip, left knee, left ankle, left foot, right hip, right knee, right ankle, right foot, head, nose, left eye, left ear, right eye and right ear in order from 1 to 32, respectively, where a human skeleton joint point numbered l is called joint point l, l=1, 2, . . . , 32, and the total number of frames of data in the video filmed by each of the two Azure Kinect DK cameras is denoted as Y that is, each Azure Kinect DK camera obtains Y frames of data; and S2.5. at the data synchronization and preprocessing module, setting any one of the two Azure Kinect DK cameras as a master camera and the other as a slave camera; multiplying the three-dimensional position vector of joint point l in a a-th frame of data obtained by the slave camera by the coordinate system transformation matrix W to obtain a mapping vector of the joint point l in the coordinate system of the master camera, which is called the mapping vector of the joint point l and is denoted as $$z_{l,a}^{s},$$

where the three-dimensional portion vector of joint point l in a a-th frame of data obtained by the master camera is denoted as $$z_{l,a}^{m},$$

a=1, 2, . . . , Y; realizing spatio-temporal synchronization of data from the two Azure Kinect DK cameras by the coordinate system transformation matrix W, IEEE 1588v2 (PTP) protocol or a dedicated synchronization chip; the data synchronization and preprocessing module outputting the obtained data to the core computing and fusion module; and step 3. in the core computing and fusion module, firstly, setting a global three-dimensional position vector estimate of the joint point l of the a-th frame data as $$\hat{x}_{l,a|a}^{f},$$

and setting the uncertainty value of $$\hat{x}_{l,a|a}^{f}$$

as a covariance matrix $$P_{l,a|a}^{f};$$

initializing the global three-dimensional position vector estimate $$\hat{x}_{l,1|1}^{f}$$

of the joint point l of the first frame of the data, letting $$\hat{x}_{l,1|1}^{f} = (z_{l,1}^{m} + z_{l,1}^{s})/2,$$

initializing the covariance matrix $$P_{l,1|1}^{f}$$

of $$\hat{x}_{l,1|1}^{f},$$

letting $$P_{l,1|1}^{f} = 3 * 3$$

unit matrix which is denoted as I; setting a measurement noise covariance of $$z_{l,a}^{m}$$

as $$R_{a}^{m}$$

and letting $$R_{a}^{m} = 3 * I;$$

setting a measurement noise covariance of $$z^s_{l,a}$$

as $$R^s_a$$

and letting $$R^s_a = 3 * I;$$

setting a measurement matrix of any human skeleton joint point in the a-th frame of data as $H_a$ and letting $H_a=1$, where * is the symbol of multiplication; and then, performing data filtering and fusion processing operations at the core computing and fusion module; wherein the step 3 comprises:

S3.1. setting a frame number variable as k, and initializing k and letting k=2;

S3.2. processing the three-dimensional position vector $$z^m_{l,k}$$

of the joint point l in the k-th data obtained by the master camera and the mapping vector $$z^s_{l,k}$$

of the joint point l to obtain the global three-dimensional position vector estimate $$\hat{x}^f_{l,k|k}$$

of the joint point l in the k-th frame of data; wherein S3.2 comprises:

S3.2.1. setting a state transition matrix of the k-th frame of data as $F_k$, and letting $F_k=I$; setting a process noise covariance matrix of the k-th frame of data as $Q_k$, and letting $Q_k=0.2*I$; setting a predicated global three-dimensional position vector of the joint point l in the k-th frame of data as $$\hat{x}^f_{l,k|k-1};$$

setting the covariance matrix of $$\hat{x}^f_{l,k|k-1}$$

as $$P^f_{l,k|k-1};$$

S3.2.2. based on previous human motion estimates $$\hat{x}^f_{l,k-1|k-1} \text{ and } P^f_{l,k-1|k-1},$$

calculating the predicted values $$\hat{x}^f_{l,k|k-1} \text{ and } P^f_{l,k|k-1}$$

for current human motion estimates using equations (1) and (2) respectively:

$$\hat{x}^f_{l,k|k-1} = F_k * \hat{x}^f_{l,k-1|k-1} \tag{1}$$

$$P^f_{l,k|k-1} = F_k * P^f_{l,k-1|k-1} * F^T_k + Q_k \tag{2}$$

in Equation (2), corner mark T represents the transpose symbol of the matrix;

S3.2.3. setting the square of Mahalanobis distance between $$z^s_{l,k} \text{ and } z^m_{l,k}$$

as $$\gamma(z^s_{l,k}, z^m_{l,k}),$$

and calculating $$\gamma(z^s_{l,k}, z^m_{l,k})$$

using Equation (3);

$$\gamma(z^s_{l,k}, z^m_{l,k}) = (z^s_{l,k} - z^m_{l,k})^T * \sum\nolimits_{zz}^{-1} * (z^s_{l,k} - z^m_{l,k}) \tag{3}$$

in equation (3), $$\sum\nolimits_{zz}^{-1} = (R^s_k + R^m_k)^{-1};$$

S3.2.4. setting the square of Mahalanobis distance between $$z^s_{l,k} \text{ and } H_k * \hat{x}^f_{l,k|k-1}$$

as $$\gamma(z^s_{l,k}, H_k * \hat{x}^f_{l,k|k-1}),$$

setting the square of Mahalanobis distance between $$z^m_{l,k} \text{ and } H_k * \hat{x}^f_{l,k|k-1}$$

as $$\gamma(z^m_{l,k}, H_k * \hat{x}^f_{l,k|k-1}),$$

and calculating $$\gamma(z^s_{l,k}, H_k * \hat{x}^f_{l,k|k-1}) \text{ and } \gamma(z^m_{l,k}, H_k * \hat{x}^f_{l,k|k-1})$$

respectively using Equations (4) and (5):

$$\gamma(z^s_{l,k}, H_k * \hat{x}^f_{l,k|k-1}) = (z^s_{l,k} - H_k * \hat{x}^f_{l,k|k-1})^T * \sum\nolimits_{sz}^{-1} * (z^s_{l,k} - H_k * \hat{x}^f_{l,k|k-1}) \quad (4)$$

$$\gamma(z^m_{l,k}, H_k * \hat{x}^f_{l,k|k-1}) = (z^m_{l,k} - H_k * \hat{x}^f_{l,k|k-1})^T * \sum\nolimits_{mz}^{-1} * (z^m_{l,k} - H_k * \hat{x}^f_{l,k|k-1}) \quad (5)$$

in equation (4), $$\sum\nolimits_{sz}^{-1} = (R^s_k + H_k * P^f_{l,k|k-1} * H^T_k)^{-1},$$

and in equation (5)

$$\sum\nolimits_{mz}^{-1} = (R^m_k + H_k * P^f_{l,k|k-1} * H^T_k)^{-1};$$

S3.2.5. setting a confidence threshold of joint point l as $\chi_1$, where the value of $\chi_1$ is not less than 10 but not greater than 20;

S3.2.6. comparing $$\gamma(z^s_{l,k}, z^m_{l,k}),\ \gamma(z^s_{l,k}, H_k * \hat{x}^f_{l,k|k-1}) \text{ and } \gamma(z^m_{l,k}, H_k * \hat{x}^f_{l,k|k-1})$$

with $\chi_1$ respectively and then performing data processing based on the comparison results respectively; specifically, when the comparison results satisfy $$\gamma(z^s_{l,k}, z^m_{l,k}) < \chi_l, \text{ or } \gamma(z^s_{l,k}, H_k * \hat{x}^f_{k|k-1}) < \chi_l \text{ and } \gamma(z^m_{l,k}, H_k * \hat{x}^f_{k|k-1}) < \chi_l,$$

the processing process including:

A1. calculating a local three-dimensional position vector estimate $$\hat{x}^s_{l,k|k}$$

of joint point l in the k-th frame of data obtained by the slave camera and the covariance matrix $$P^s_{l,k|k} \text{ of } \hat{x}^s_{l,k|k}$$

respectively using Equations (6), (7) and (8):

$$\hat{x}^s_{l,k|k} = \hat{x}^f_{l,k|k-1} + K^s_k * (z^s_{l,k} - H_k * \hat{x}^f_{l,k|k-1}) \quad (6)$$

$$K^s_k = P^f_{l,k|k-1} * H^T_k * (H_k * P^f_{l,k|k-1} * H^T_k + R^s_k)^{-1} \quad (7)$$

$$P^s_{l,k|k} = (I - K^s_k * H_k) * P^f_{l,k|k-1} \quad (8)$$

A2. calculating a local three-dimensional position vector estimate $$\hat{x}^m_{l,k|k}$$

of joint point l in the k-th frame of data obtained by the master camera and the covariance matrix $$P^m_{l,k|k}$$

of $$\hat{x}^m_{l,k|k}$$

respectively using Equations (9), (10) and (11):

$$\hat{x}^m_{l,k|k} = \hat{x}^f_{l,k|k-1} + K^m_k * (z^m_{l,k} - H_k * \hat{x}^f_{l,k|k-1}) \quad (9)$$

$$K^m_k = P^f_{l,k|k-1} * H^T_k * (H_k * P^f_{l,k|k-1} * H^T_k + R^m_k)^{-1} \quad (10)$$

$$P^m_{l,k|k} = (I - K^m_k * H_k) * P^f_{l,k|k-1} \quad (11)$$

A3. entering step S3.2.7; when the comparison results satisfy $$\gamma(z^s_{l,k}, z^m_{l,k}) \geq \chi_l \text{ and } \gamma(z^s_{l,k}, H_k * \hat{x}^f_{k|k-1}) < \chi_l \text{ and } \chi_1 \leq \gamma(z^m_{l,k}, H_k * \hat{x}^f_{k|k-1}),$$

the processing process specifically including:

B1. calculating the local three-dimensional position vector estimate $$\hat{x}^s_{l,k|k}$$

of joint point l in the k-th frame of data obtained by the slave camera and the covariance matrix $$P^s_{l,k|k}$$

of $$\hat{x}^{s}_{l,k|k}$$

respectively using Equations (6), (7) and (8):

B2. determining whether $$\gamma\left(z^{m}_{l,k},\, H_k * \hat{x}^{f}_{k|k-1}\right) \geq 2 * \chi_l$$

is established; if so, letting $$\hat{x}^{m}_{l,k|k} = \hat{x}^{f}_{l,k|k1} \text{ and } P^{m}_{l,k|k} = P^{f}_{l,k|k-1};$$

then, entering step S3.2.7; if not, continuing to perform progressive filtering on the three-dimensional position vector $$z^{m}_{l,k}$$

of the joint point l in the k-th frame of data acquired by the master camera; specifically, the progressive filtering process including:

$$k\, l\, \hat{x}^{m}_{l,k|k}$$

B2.1. setting the iteration variable of progressive filtering as t, setting the maximum number M of iteration steps as M=10, and setting state variables in the progressive filtering as $$\hat{x}^{m,0}_{l,k|k},\, \hat{P}^{m,0}_{l,k|k};$$

B2.2. initializing t, and letting t=1; initializing $$\hat{x}^{m,0}_{l,k|k} \text{ and } \hat{P}^{m,0}_{l,k|k},$$

and letting $$\hat{x}^{m,0}_{l,k|k} = \hat{x}^{f}_{l,k|k-1},\, \hat{P}^{m,0}_{l,k|k} = P^{f}_{l,k|k-1};$$

and

B2.3. performing a t-th iteration of filtering; specifically,

B2.3.1. calculating the intermediate state variable $$\hat{x}^{m,t}_{l,k|k}$$

of the t-th iteration, the intermediate state covariance matrix $$P^{m,t}_{l,k|k}$$

of the t-th iteration, and the intermediate determination variable $$\varphi^{m,t}_{k}$$

of the t-th iteration using Equations (12) to (16):

$$\left(P^{m,t}_{l,k|k}\right)^{-1} * \hat{x}^{m,t}_{l,k|k} = \left(P^{m,t-1}_{l,k|k}\right)^{-1} * \hat{x}^{m,t-1}_{l,k|k} + (H_k)^T * (M * R^{m}_{k})^{-1} z^{m}_{l,k} \tag{12}$$

$$\left(P^{m,t}_{l,k|k}\right)^{-1} = \left(P^{m,t-1}_{l,k|k}\right)^{-1} + (H_k)^T * (M * R^{m}_{k})^{-1} * H_k \tag{13}$$

$$\varphi^{m,t}_{k} = \gamma\left(z^{s}_{l,k},\, H_k * \hat{x}^{m,t}_{l,k|k}\right) - \gamma\left(z^{s}_{l,k},\, H_k * \hat{x}^{m,t-1}_{l,k|k}\right) \tag{14}$$

$$\gamma\left(z^{s}_{l,k},\, H_k * \hat{x}^{m,t}_{l,k|k}\right) = \left(z^{s}_{l,k} - H_k * \hat{x}^{m,t}_{l,k|k}\right)^T * \sum\nolimits^{-1}_{sm,t} * \left(z^{s}_{l,k} - H_k * \hat{x}^{m,t}_{l,k|k}\right) \tag{15}$$

$$\gamma\left(z^{s}_{l,k},\, H_k * \hat{x}^{m,t-1}_{l,k|k}\right) = \left(z^{s}_{l,k} - H_k * \hat{x}^{m,t}_{l,k|k}\right)^T * \sum\nolimits^{-1}_{sm,t} * \left(z^{s}_{l,k} - H_k * \hat{x}^{m,t-1}_{l,k|k}\right) \tag{16}$$

in the above equations, $$\sum\nolimits^{-1}_{sm,t} = \left(R^{s}_{k} + H_k * P^{m,t}_{l,k|k} * H^{T}_{k}\right)^{-1},$$

$$\sum\nolimits^{-1}_{sm,t-1} = \left(R^{s}_{k} + H_k * P^{m,t-1}_{l,k|k} * H^{T}_{k}\right)^{-1};$$

and

B2.3.2. determining whether $$\varphi^{m,t}_{k} > 0$$

is established; if so, letting $$\hat{x}^{m}_{1,k|k} = \hat{x}^{m,t}_{l,k|k},\, P^{m}_{l,k|k} = P^{m,t}_{l,k|k},$$

and then, entering step S3.2.7; if not, further determining whether the current value of t is equal to M; if not, updating the value of t with the current value of t plus 1, and then returning to step B2.3 for next iteration; and if so, letting $$\hat{x}^{m}_{l,k|k} = \hat{x}^{m,M}_{l,k|k},\, P^{m}_{l,k|k} = P^{m,M}_{l,k|k},$$

and then entering step S3.2.7; and when the comparison results satisfy $$\gamma\left(z^{s}_{l,k},\, z^{m}_{l,k}\right) \geq \chi_l \text{ and } \gamma\left(z^{m}_{l,k},\, H_k * \hat{x}^{f}_{k|k-1}\right) < \chi_l \text{ and } \chi_l \leq \gamma\left(z^{s}_{l,k},\, H_k * \hat{x}^{f}_{k|k-1}\right),$$

the processing process specifically including:

C1. calculating the local three-dimensional position vector estimate $$\hat{x}^{m}_{l,k|k}$$

of joint point l in the k-th frame of data acquired by the master camera and the covariance matrix $$P^{m}_{l,k|k}$$

of $$\hat{x}^{m}_{l,k|k}$$

respectively using Equations (9), (10) and (11):

C2. determining whether $$\gamma\left(z^{s}_{l,k}, H_k * \hat{x}^{f}_{k|k-1}\right) \geq 2 * \chi_l$$

is established; if so, letting $$\hat{x}^{s}_{l,k|k} = \hat{x}^{f}_{l,k|k-1} \text{ and } P^{s}_{l,k|k} = P^{f}_{l,k|k-1};$$

then, entering step S3.2.7; if not, continuing to perform progressive filtering on the mapping vector $$z^{s}_{l,k}$$

of the joint point l in the k-th frame of data acquired by the slave camera; specifically, the progressive filtering process including:

$$k\ l\ \hat{x}^{s}_{l,k|k}$$

C2.1. setting the iteration variable of progressive filtering as n, setting the maximum number N of iteration steps as N=10, and setting state variables in the progressive filtering as $$\hat{x}^{s}_{l,k|k}, \hat{P}^{s}_{l,k|k};$$

and

C2.2. initializing n and letting n=1; initializing $$\hat{x}^{s,0}_{l,k|k} \text{ and } \hat{P}^{s,0}_{l,k|k},$$

and letting $$\hat{x}^{s,0}_{l,k|k} = \hat{x}^{f}_{l,k|k-1}, \hat{P}^{s,0}_{l,k|k} = P^{f}_{l,k|k-1};$$

and

C2.3. performing an n-th iteration of filtering; specifically,

C2.3.1. calculating the intermediate state variable $$\hat{x}^{s,n}_{l,k|k},$$

intermediate state covariance matrix $$P^{s,n}_{l,k|k}$$

and intermediate determination variable $$\varphi^{s,n}_{k}$$

of the n-th iteration of progressive filtering in the slave camera using Equations (17) to (21):

$$\left(P^{s,n}_{l,k|k}\right)^{-1} * \hat{x}^{s,n}_{l,k|k} = \left(P^{s,n-1}_{l,k|k}\right)^{-1} * \hat{x}^{s,n-1}_{l,k|k} + (H_k)^T * (N * R^{s}_{k})^{-1} * z^{s}_{l,k} \tag{17}$$

$$\left(P^{s,n}_{l,k|k}\right)^{-1} = \left(P^{s,n-1}_{l,k|k}\right)^{-1} + (H_k)^T * (N * R^{s}_{k})^{-1} * H_k \tag{18}$$

$$\varphi^{s,n}_{k} = \gamma\left(z^{m}_{l,k}, H_k * \hat{x}^{s,n}_{l,k|k}\right) - \gamma\left(z^{m}_{l,k}, H_k * \hat{x}^{s,n-1}_{l,k|k}\right) \tag{19}$$

$$\gamma\left(z^{m}_{l,k}, H_k * \hat{x}^{s,n}_{l,k|k}\right) = \left(z^{m}_{l,k} - H_k * \hat{x}^{s,n}_{l,k|k}\right)^T * \sum\nolimits^{-1}_{ms,n} * \left(z^{m}_{l,k} - H_k * \hat{x}^{s,n}_{l,k|k}\right) \tag{20}$$

$$\gamma\left(z^{m}_{l,k}, H_k * \hat{x}^{s,n-1}_{l,k|k}\right) = \left(z^{m}_{l,k} - H_k * \hat{x}^{s,n-1}_{l,k|k}\right)^T * \sum\nolimits^{-1}_{ms,n-1} * \left(z^{m}_{l,k} - H_k * \hat{x}^{s,n-1}_{l,k|k}\right) \tag{21}$$

in the above equations, $$\sum\nolimits^{1}_{ms,n} = \left(R^{m}_{k} + H_k * P^{s,n}_{l,k|k} * H^{T}_{k}\right)^{-1}, \sum\nolimits^{-1}_{ms,n-1} = \left(R^{m}_{k} + H_k * P^{s,n-1}_{l,k|k} * H^{T}_{k}\right)^{-1};$$

and

C2.3.2. determining whether $$\varphi^{s,n}_{k} > 0$$

is established; if so, letting $$\hat{x}^{s}_{l,k|k} = \hat{x}^{s,n}_{l,k|k}, P^{s}_{l,k|k} = P^{s,n}_{l,k|k},$$

and then, entering step S3.2.7; if not, further determining whether the current value of n is equal to N; if not, updating the value of n with the current value of n plus 1, and then returning to step C2.3 for next iteration of filtering; and if so, letting $$\hat{x}^s_{l,k|k} = \hat{x}^{s,N}_{l,k|k},\ P^s_{l,k|k} = P^{s,N}_{l,k|k},$$

and then entering step S3.2.7;

when comparison results satisfy $$\gamma(z^s_{l,k}, z^m_{l,k}) \geq \chi_l \text{ and } \gamma(z^s_{l,k}, H_k * \hat{x}^f_{k|k-1}) \geq \chi_l \text{ and } \gamma(z^m_{l,k}, H_k * \hat{x}^f_{k|k-1}) \geq \chi_l,$$

directly letting $$\hat{x}^s_{l,k|k} = \hat{x}^f_{l,k|k-1},\ P^s_{l,k|k} = P^f_{l,k|k-1},\ \hat{x}^m_{l,k|k} = \hat{x}^f_{l,k|k-1},\ P^m_{l,k|k} = P^f_{l,k|k-1}$$

and then entering step S3.2.7;

S3.2.7. calculating the global three-dimensional position vector estimate $$\hat{x}^f_{l,k|k}$$

of joint point l in the k-th frame of data obtained and the covariance matrix $$P^f_{l,k|k}$$

of $$\hat{x}^f_{l,k|k}$$

respectively using Equations (22) and (23); and $$P^f_{l,k|k} = \left[(P^s_{l,k|k})^{-1} + (P^m_{l,k|k})^{-1} - (P^f_{l,k|k-1})^{-1}\right]^{-1} \tag{22}$$

$$\hat{x}^f_{l,k|k} = P^f_{l,k|k} * \left[(P^s_{l,k|k})^{-1} * \hat{x}^s_{l,k|k} + (P^m_{l,k|k})^{-1} * \hat{x}^m_{l,k|k} - (P^f_{l,k|k-1})^{-1} * \hat{X}^f_{l,k|k-1}\right] \tag{23}$$

S3.3. determining whether the current value of k is equal to Y; if not, updating the value of k with the current value of k plus 1, and then returning to step S3.2 for processing a next frame of data; if so, ending the human pose estimation, with $$\hat{x}^f_{1,1|1}, \ldots, \hat{x}^f_{32,1|1}, \hat{x}^f_{1,2|2}, \ldots, \hat{x}^f_{32,2|2}, \ldots, \hat{x}^f_{1,Y|Y} \ldots, \hat{x}^f_{32,Y|Y}$$

being regarded as the obtained human pose data.

2. The multi-view fusion human motion estimation method based on distributed progressive Gaussian filtering according to claim 1, wherein the data synchronization and preprocessing module is implemented by using a QX550 network card in combination with a PSB (Platform Sync Board) module.

3. The multi-view fusion human motion estimation method based on distributed progressive Gaussian filtering according to claim 1, wherein the core computing and fusion module is implemented using embedded AI computers (NVIDIA Jetson AGX Orin and Xilinx FPGA) and field programmable gate array products (Xilinx FPGA).

* * * * *